US009628686B2

(12) United States Patent
Shih et al.

(10) Patent No.: US 9,628,686 B2
(45) Date of Patent: Apr. 18, 2017

(54) IMAGE SURVEILLANCE DEVICE

(71) Applicant: VIVOTEK INC., New Taipei (TW)

(72) Inventors: Li-Shan Shih, New Taipei (TW);
Chih-Chung Wang, New Taipei (TW);
Yi-Chuan Chen, New Taipei (TW);
Wen-Yuan Li, New Taipei (TW)

(73) Assignee: VIVOTEK INC., New Taipei (TW)

( * ) Notice: Subject to any disclaimer, the term of this patent is extended or adjusted under 35 U.S.C. 154(b) by 0 days.

(21) Appl. No.: 15/064,611

(22) Filed: Mar. 9, 2016

(65) Prior Publication Data
US 2016/0301839 A1   Oct. 13, 2016

(30) Foreign Application Priority Data

Apr. 10, 2015   (TW) .............................. 104111669 A

(51) Int. Cl.
*H04N 5/225*   (2006.01)
(52) U.S. Cl.
CPC ......... *H04N 5/2256* (2013.01); *H04N 5/2252* (2013.01)
(58) Field of Classification Search
CPC .. H04N 5/2256; H04N 5/2252; H04N 5/2254; H04N 7/181; H04N 5/2354; H04N 5/33; H04N 5/332; H01L 33/52; H01L 33/54; H01L 33/58; H01L 33/62; H01L 33/64; G08B 13/19626; G08B 13/19636; G08B 13/19643
USPC ........................................................ 348/373
See application file for complete search history.

(56) References Cited

U.S. PATENT DOCUMENTS

| 7,724,280 | B2 | 5/2010 | Gin | |
|---|---|---|---|---|
| 2003/0093805 | A1* | 5/2003 | Gin | G08B 13/19619 725/105 |
| 2004/0012715 | A1* | 1/2004 | Gin | G08B 13/19619 348/375 |
| 2006/0115265 | A1* | 6/2006 | Elberbaum | F16M 11/18 396/427 |
| 2007/0013779 | A1 | 1/2007 | Gin | |
| 2009/0207249 | A1* | 8/2009 | Erel | G08B 13/19619 348/143 |
| 2009/0284596 | A1* | 11/2009 | Lin | H04N 5/2252 348/143 |

(Continued)

FOREIGN PATENT DOCUMENTS

| CN | 100508598 C | 7/2009 |
|---|---|---|
| EP | 2 346 100 A3 | 4/2015 |

*Primary Examiner* — Pritham Prabhakher
(74) *Attorney, Agent, or Firm* — Winston Hsu; Scott Margo

(57) ABSTRACT

An image surveillance device includes a casing, a heat dissipating cover, a partition, a lens module, and a light emitting module. The heat dissipating cover covers the casing and has a heat conduction sheet extending inward into the casing. The partition is disposed in the casing to divide an inner space of the casing into an upper space and a lower space. The lens module is disposed in the lower space for capturing images. The light emitting module is disposed on the heat conduction sheet and located in the upper space for emitting light out of the casing when the lens module captures the images. Heat generated by the light emitting module is conducted to the heat dissipating cover via the heat conduction sheet.

14 Claims, 5 Drawing Sheets

(56) References Cited

U.S. PATENT DOCUMENTS

2012/0242788 A1\* 9/2012 Chuang ............ G08B 13/19602
                                                          348/36
2012/0327242 A1\* 12/2012 Barley .................. H04N 5/232
                                                         348/155
2015/0015703 A1\* 1/2015 LaFemina ........... F21V 33/0076
                                                         348/143

\* cited by examiner

IMAGE SURVEILLANCE DEVICE

BACKGROUND OF THE INVENTION

1. Field of the Invention

The present invention relates to an image surveillance device, and more specifically, to an image surveillance device disposing a light emitting module on a heat conduction sheet extending from an upper heat-dissipating cover inward into a casing for heat dissipation.

2. Description of the Prior Art

In general, an image surveillance device has a light source (e.g. an infrared light emitting diode) disposed therein for providing auxiliary light to capture clear images when the image surveillance device is operated in a dark environment (e.g. in an indoor environment or in the night). A conventional design is to dispose light sources around a lens module in a side-by-side arrangement for providing light when the lens module captures images.

However, the aforesaid design in which the light sources are arranged side by side may cause the problem that the image surveillance device would have an excessive volume. Furthermore, since the light sources could generate heat during operation, it may cause malfunctioning of other electronic components (e.g. a circuit board and a lens module) in the image surveillance device if there is no heat dissipating device disposed in the image surveillance device for heat dissipation of the light sources. On the contrary, if a heat dissipating device is additionally disposed in the image surveillance device for heat dissipation of the light sources, additional disposal of the heat dissipating device would occupy much internal space of the image surveillance device so as to be disadvantageous to the thinning design of the image surveillance device.

SUMMARY OF THE INVENTION

The present invention provides an image surveillance device. The image surveillance device includes a casing, an upper heat-dissipating cover, a partition, at least one lens module, and at least one light emitting module. The upper heat-dissipating cover covers the casing and has a heat conduction sheet extending inward into the casing. The partition is disposed in the casing for dividing an inner space of the casing into an upper space and a lower space. The at least one lens module is disposed in the lower space for capturing images. The at least one light emitting module is disposed on the heat conduction sheet and located in the upper space for emitting light out of the casing when the lens module captures the images. Heat generated by the light emitting module is conducted to the upper heat-dissipating cover via the heat conduction sheet.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
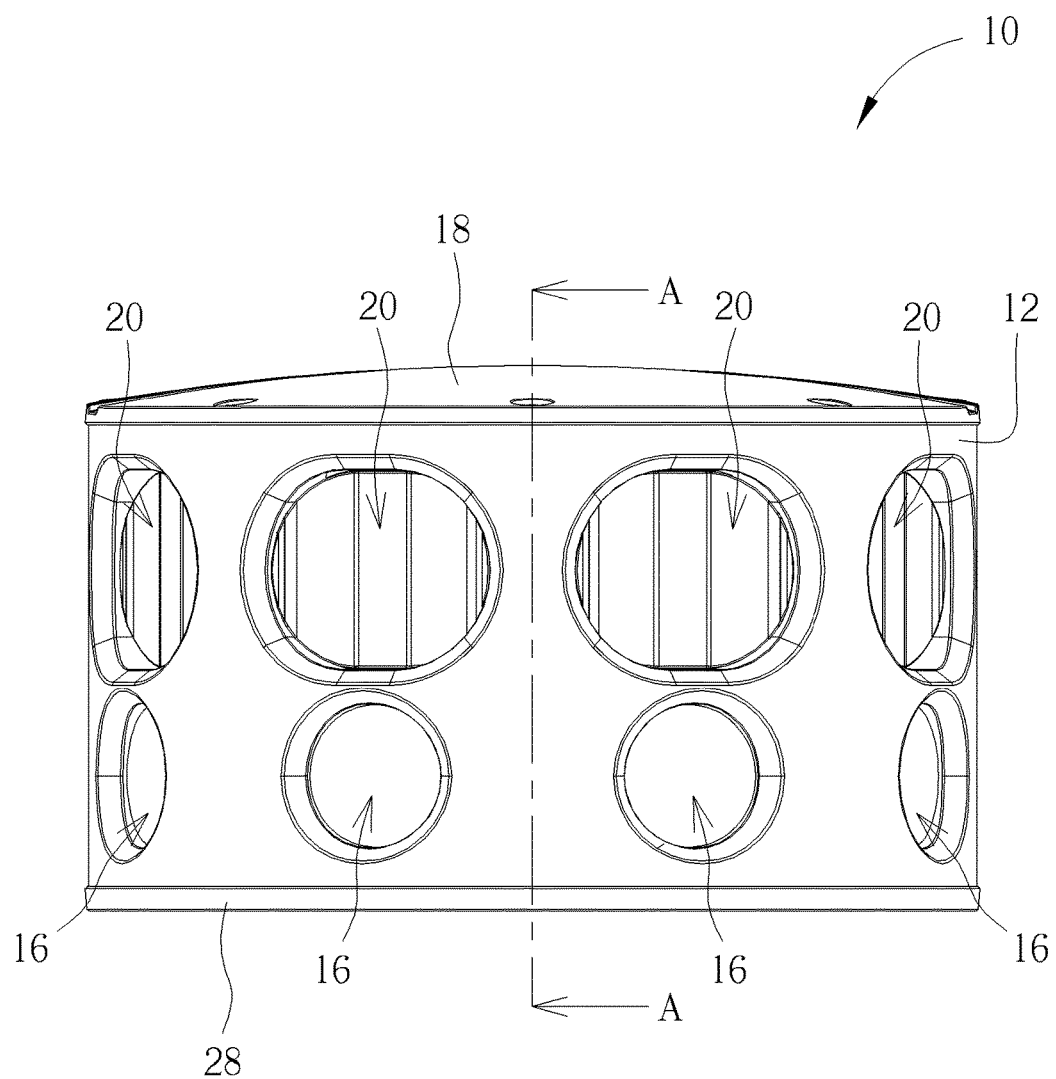
FIG. 1 is a front view of an image surveillance device according to an embodiment of the present invention.
Figure 2:
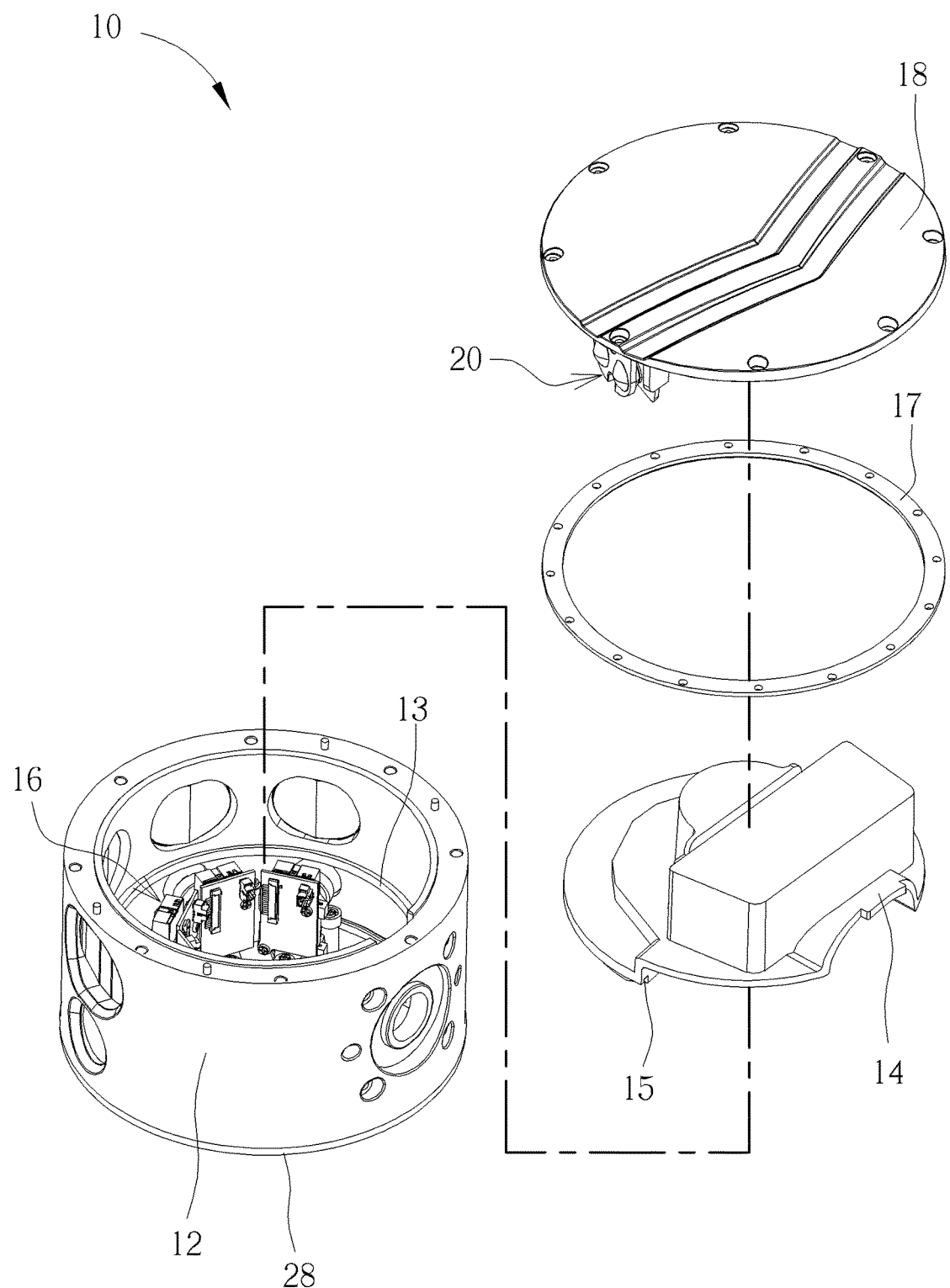
FIG. 2 is an exploded diagram of the image surveillance device in FIG. 1.
Figure 3:
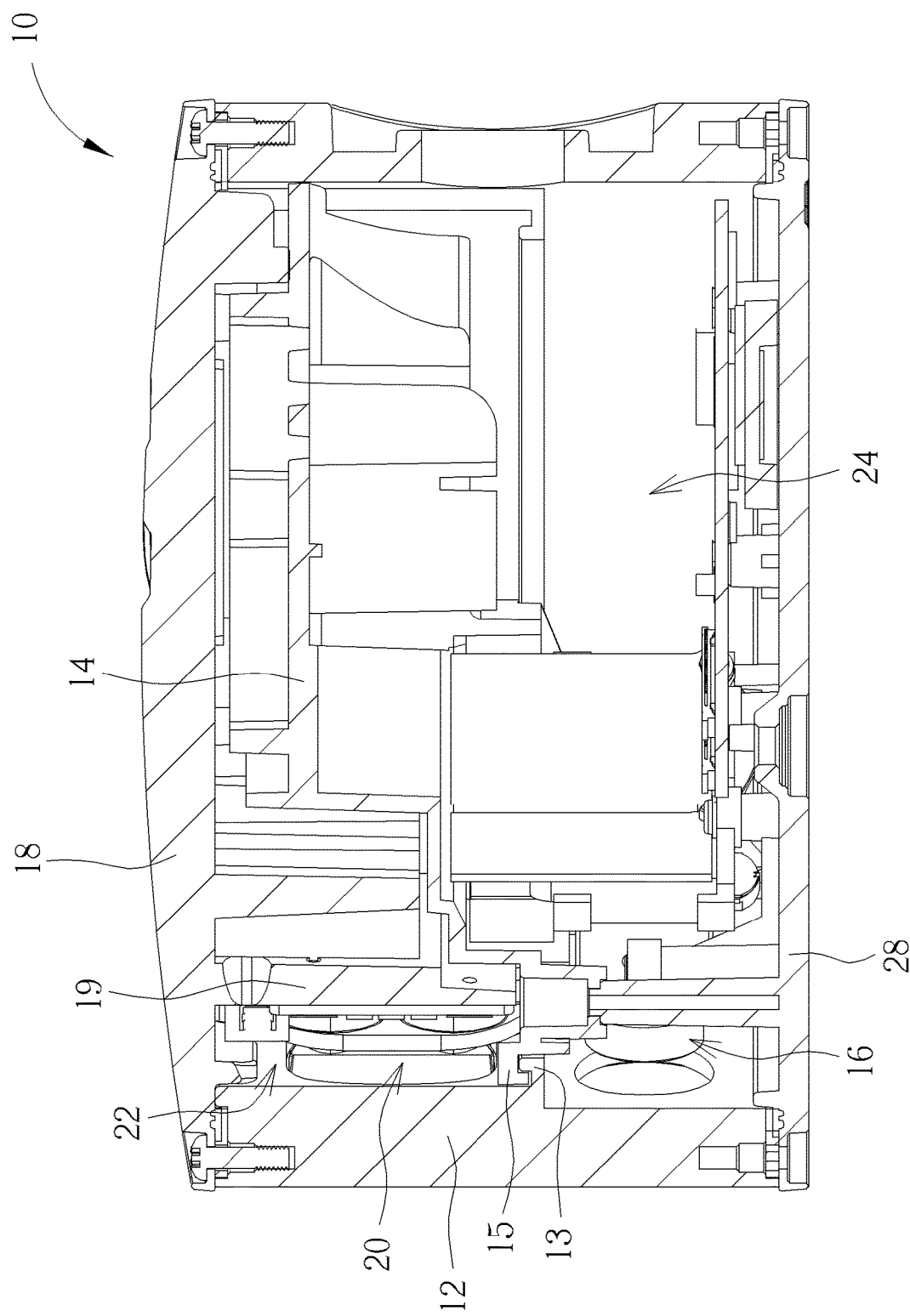
FIG. 3 is a sectional diagram of the image surveillance device in FIG. 1 along a sectional line A-A.

Please refer to FIG. 1, FIG. 2, and FIG. 3. FIG. 1 is a front view of an image surveillance device 10 according to an embodiment of the present invention. FIG. 2 is an exploded diagram of the image surveillance device 10 in FIG. 1. FIG. 3 is a sectional diagram of the image surveillance device 10 in FIG. 1 along a sectional line A-A. As shown in FIG. 1, FIG. 2, and FIG. 3, the image surveillance device 10 includes a casing 12, a partition 14, at least one lens module 16 (four shown in FIG. 1, but not limited thereto), an upper heat-dissipating cover 18, and at least one light emitting module 20 (four shown in FIG. 1, but not limited thereto). The image surveillance device 10 could be preferably a monitoring camera with plural lenses, but not limited thereto. The partition 14 is disposed in the casing 12 to divide an inner space of the casing 12 into an upper space 22 and a lower space 24 for containing the light emitting module 20 and the lens module 16 respectively. To be more specific, the light emitting module 20 is disposed in the upper space 22 and the lens module 16 is disposed in the lower space 24, so that the light emitting module 20 and the lens module 16 could be disposed in the image surveillance device 10 in a vertical arrangement. Accordingly, the overall volume of the image surveillance device 10 could be further reduced.

Furthermore, as shown in FIG. 2 and FIG. 3, an edge of the partition 14 has a first bending engaging structure 15. A second bending engaging structure 13 is formed in the casing 12 corresponding to the edge of the partition 14. The first bending engaging structure 15 is engaged with the second bending engaging structure 13 for making the partition 14 engaged with the casing more steadily. Via the aforesaid partitioning design and the structural engaging design, the partition 14 could prevent light emitted by the light emitting module 20 from being incident into the lens module 16 via the internal assembly clearance of the image surveillance device 10, and could block heat generated by the image surveillance device 10 in the upper space 22 from being conducted to the lower space 24, so as to solve the light leakage problem and generate the heat insulation effect. Furthermore, as shown in FIG. 2, the image surveillance device 10 could further include a blocking pad 17. The blocking pad 17 is disposed between the upper heat-dissipating cover 18 and the casing 12 for blocking foreign objects from entering the image surveillance device 10 through the assembly clearance between the upper heat-dissipating cover 18 and the casing 12, so as to generate the dustproof and waterproof effects.

Figure 4:
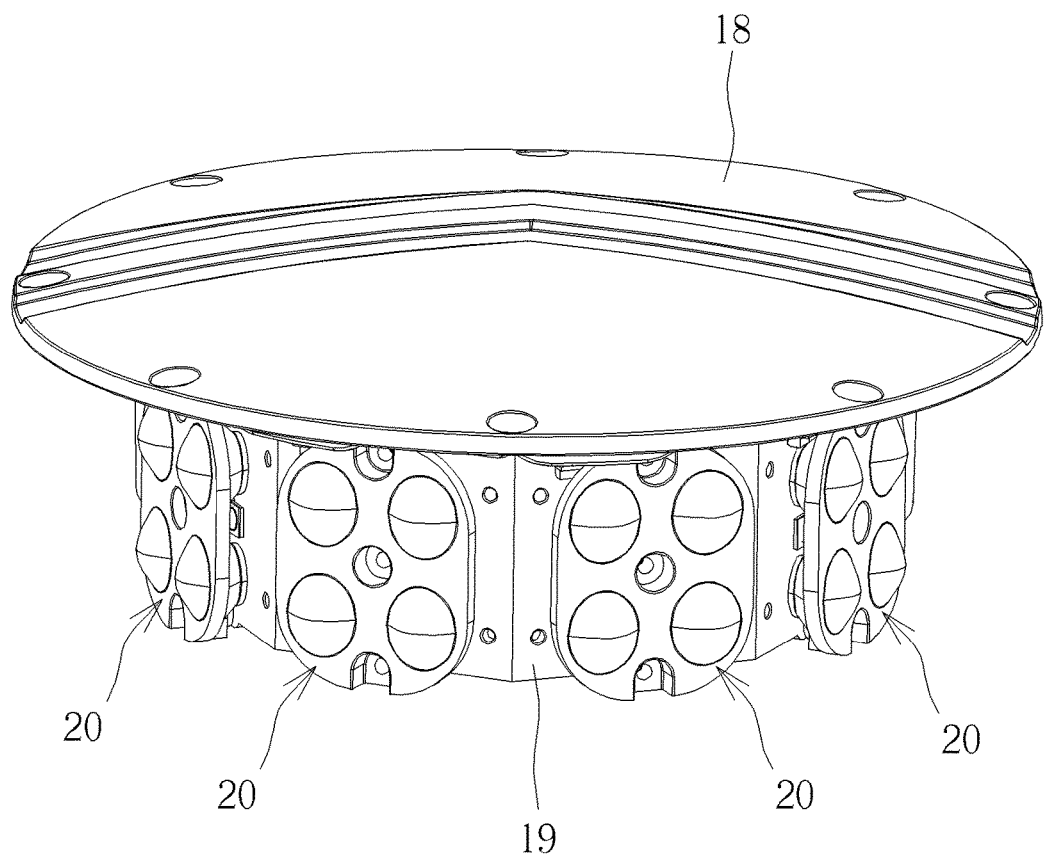
FIG. 4 is a diagram of an upper heat-dissipating cover with a light emitting module at another viewing angle.

Please refer to FIG. 2, FIG. 3, and FIG. 4. FIG. 4 is a diagram of the upper heat-dissipating cover 18 with the light emitting module 20 at another viewing angle. As shown in FIG. 2, FIG. 3, and FIG. 4, the upper heat-dissipating cover 18 covers the casing 12 and has a heat conduction sheet 19 extending inward into the casing 12. The light emitting module 20 could be preferably an infrared light emitting diode (but not limited thereto, meaning that the light emitting module 20 could be other type of light emitting diode, such as a visible light emitting diode) and disposed on the heat conduction sheet 19 for providing light to the lens module 16 when the lens module 16 captures images. Via the aforesaid design, heat generated by the light emitting module 20 during operation could be conducted to the upper heat-dissipating cover 18 via the heat conduction sheet 19 for heat dissipation of the light emitting module 20. In such a manner, since there is no need to additionally dispose a heat dissipating device in the image surveillance device 10 for performing heat dissipation of the light emitting module 20, the present invention not only efficiently solves the prior art problem that additional disposal of the heat dissipating device would occupy much internal space of the image surveillance device, but also prevents malfunctioning of electronic components (e.g. a circuit board and a lens module) in the image surveillance device 10 due to the heat generated by the light emitting module 20.

Figure 5:
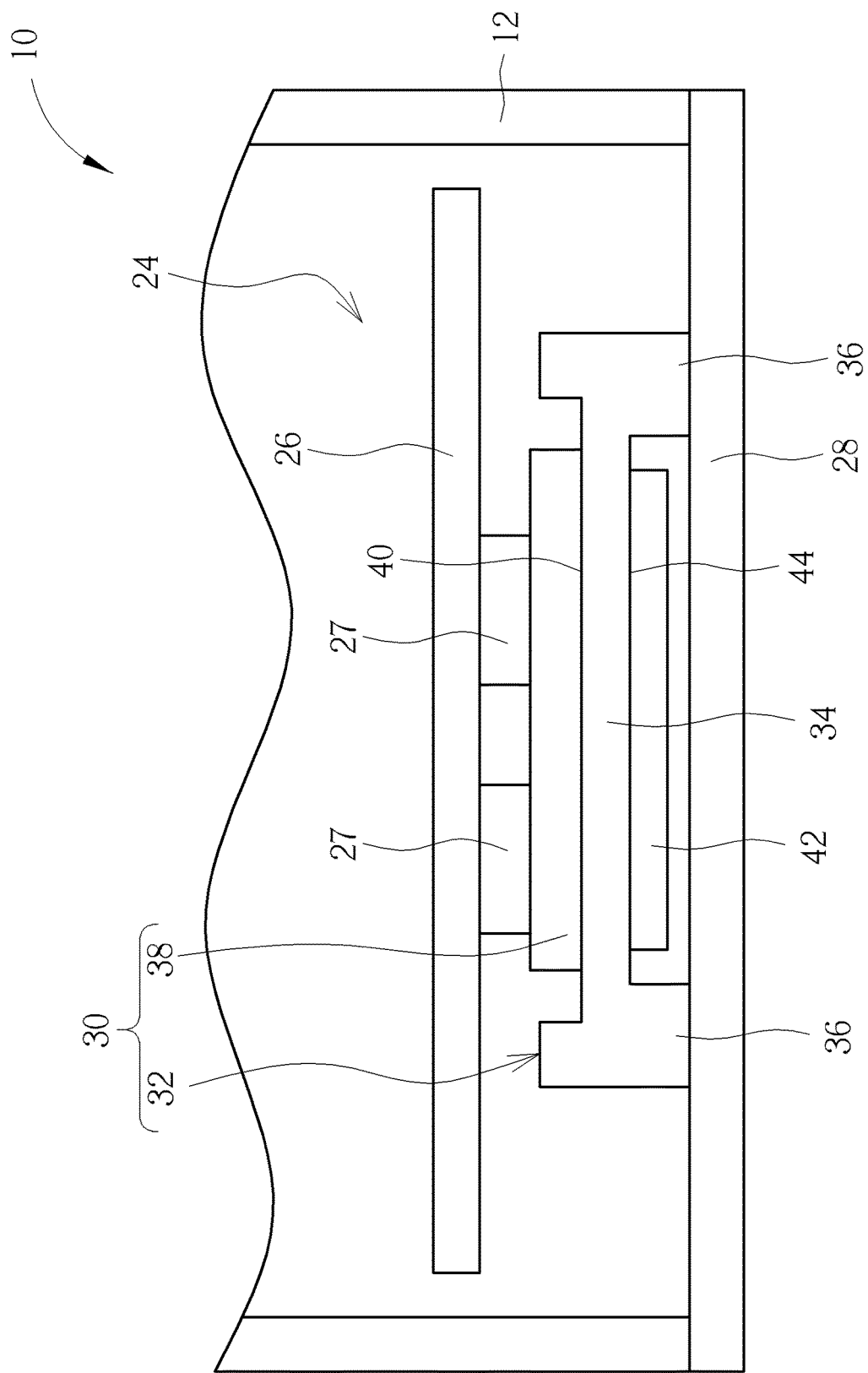
FIG. 5 is a partial internal diagram of the image surveillance device in FIG. 1.

In practical application, for further improving the heat dissipating efficiency of the image surveillance device 10, the image surveillance device 10 could adopt a heat dissipating design for performing heat dissipation of heat generating components located in the lower space 24. For example, please refer to FIG. 5, which is a partial internal diagram of the image surveillance device 10 in FIG. 1. As shown in FIG. 5, the image surveillance device 10 could further include a printed circuit board 26, a lower heat-dissipating cover 28, and a heat conduction module 30. The printed circuit board 26 could have at least one electronic component 27 (two shown in FIG. 5, but not limited thereto). The electronic component 27 could be a component commonly installed on a printed circuit board of an image surveillance device, such as SOC (System on Chip) or DDR RAM (Data Rate Random Access Memory). The lower heat-dissipating cover 28 covers the casing 12, and the heat conduction module 30 is disposed between the printed circuit board 26 and the lower heat-dissipating cover 28, so that heat generated by the electronic component 27 on the printed circuit board 26 could be conducted to the lower heat-dissipating cover 28 via the heat conduction module 30. To be more specific, in this embodiment, the heat conduction module 30 could include a mounting base 32 having a heat conduction base portion 34 and at least one heat conduction pillar portion 36 (two shown in FIG. 5, but not limited thereto). The heat conduction base portion 34 and the heat conduction pillar portion 36 are made of material with a high heat transfer coefficient (e.g. copper or aluminum). The heat conduction pillar portion 36 is connected to the lower heat-dissipating cover 28, and the electronic component 27 is disposed on the heat conduction base portion 34. Accordingly, the heat generated by the electronic component 27 during operation could be conducted to the lower heat-dissipating cover 28 via the heat conduction base portion 34 and the heat conduction pillar portion 36. Moreover, the blocking pad 27 could also be disposed between the lower heat-dissipating cover 28 and the casing 12 for generating the dustproof and waterproof effects.

To be noted, in this embodiment, as shown in FIG. 5, the heat conduction module 30 could further include a heat dissipating sheet 38. In practical application, the heat dissipating sheet 38 could be made of material with a high heat transfer coefficient and could be preferably a thermal pad. The heat dissipating sheet 38 is attached to an upper surface 40 of the heat conduction base portion 34 and the electronic component 27 and makes the printed circuit board 26 remain horizontal relative to the upper surface 40 via flexibility of the heat dissipating sheet 38. Via high heat conductivity of the heat dissipating sheer 38, the heat generated by the electronic component 27 could be conducted to the lower heat-dissipating cover 28 via the heat dissipating sheet 38, the heat conduction base portion 34 and the heat conduction pillar portion 36 more rapidly, so as to improve the heat dissipating efficiency of the heat conduction module 30.

Furthermore, since the image surveillance device 10 is mainly applied to outdoor image capturing, the image surveillance device 10 is usually operated in an environment having a wide temperature variation range. Thus, the image surveillance device 10 could further adopt a heating design to ensure that the image surveillance device 10 could be heated to the working temperature of the electronic component 27 quickly when the temperature around the image surveillance device 10 is too low. For example, as shown in FIG. 5, the image surveillance device 10 could further include a heating sheet 42. The heating sheet 42 is attached to a lower surface 44 of the heat conduction base portion 34 for generating heat. Accordingly, the heat generated by the heating sheet 42 could be conducted to the electronic component 27 via the heat conduction base portion 34 and the heat dissipating sheet 38 for heating the electronic component 27 to its working temperature. Furthermore, as shown in FIG. 5, in this embodiment, a connection area between the heat conduction pillar portion 36 and the lower heat-dissipating cover 28 could be less than a heat dissipating area of the heat dissipating sheet 38 for reducing the heat dissipation ratio of the heat generated by the heating sheet from the heat conduction pillar portion 36 to the lower heat-dissipating cover 28, so as to improve the heating efficiency of the heating sheet 42. To be noted, the ratio of the connection area between the heat conduction pillar portion 36 and the lower heat-dissipating cover 28 to the heat dissipating area of the heat dissipating sheet 38 is not limited to FIG. 5, meaning that it could vary with the practical heat-dissipating and heating needs of the image surveillance device 10.

Compared with the prior art, the present invention adopts the design that the light emitting module is directly disposed on the heat conduction sheet extending from the upper heat-dissipating cover inward into the casing, for conducting the heat generated by the light emitting module to the upper heat-dissipating cover via the heat conduction sheet. In such a manner, since there is no need to additionally dispose a heat dissipating device in the image surveillance device for performing heat dissipation of the light emitting module, the present invention not only efficiently solves the prior art problem that additional disposal of the heat dissipating device would occupy much internal space of the image surveillance device, but also prevents malfunctioning of electronic components in the image surveillance device due to the heat generated by the light emitting module. Furthermore, via the aforesaid partitioning design, the partition could prevent light emitted by the light emitting module from being incident into the lens module via the internal assembly clearance of the image surveillance device to solve the light leakage problem, and could block the heat generated by the image surveillance device in the upper space from being conducted to the lower space to generate the heat insulation effect.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. An image surveillance device comprising:
   a casing;
   an upper heat-dissipating cover covering the casing and having a heat conduction sheet extending inward into the casing;
   a partition disposed in the casing for dividing an inner space of the casing into an upper space and a lower space, wherein an edge of the partition has a first bending engaging structure, the casing has a second bending engaging structure corresponding to the edge of the partition, and the first bending engaging structure is engaged with the second bending engaging structure for making the partition engaged with the casing to form the upper space and the lower space respectively;

at least one lens module disposed in the lower space for capturing images; and at least one light emitting module disposed on the heat conduction sheet and located in the upper space for emitting light out of the casing when the lens module captures the images, heat generated by the light emitting module being conducted to the upper heat-dissipating cover via the heat conduction sheet.

2. The image surveillance device of claim 1 further comprising:

a blocking pad disposed between the upper heat-dissipating cover and the casing.

3. The image surveillance device of claim 1 further comprising:

a printed circuit board having at least one electronic component;

a lower heat-dissipating cover covering the casing; and a heat conduction module disposed between the printed circuit board and the lower heat-dissipating cover, the heat conduction module comprising:

a mounting base having a heat conduction base portion and at least one heat conduction pillar portion, the at least one heat conduction pillar portion being connected to the lower heat-dissipating cover, the at least one electronic component being disposed on the heat conduction base portion, heat generated by the printed circuit board being conducted to the lower heat-dissipating cover via the heat conduction base portion and the at least one heat conduction pillar portion.

4. The image surveillance device of claim 3, wherein the heat conduction module further comprises:

a heat dissipating sheet attached to an upper surface of the heat conduction base portion and the at least one electronic component, the heat generated by the printed circuit board being conducted to the lower heat-dissipating cover via the heat dissipating sheet, the heat conduction base portion and the at least one heat conduction pillar portion, a connection area between the at least one heat conduction pillar portion and the lower heat conduction cover is less than a heat dissipating area of the heat dissipating sheet.

5. The image surveillance device of claim 3 further comprising:

a heating sheet attached to a lower surface of the heat conduction base portion for heating the printed circuit board via the heat conduction base portion.

6. The image surveillance device of claim 3 further comprising:

a blocking pad disposed between the lower heat-dissipating cover and the casing.

7. The image surveillance device of claim 1, wherein the at least one light emitting module is an infrared light emitting diode.

8. An image surveillance device comprising:

a casing;

an upper heat-dissipating cover covering the casing and having a heat conduction sheet extending inward into the casing;

a partition disposed in the casing for dividing an inner space of the casing into an upper space and a lower space;

at least one lens module disposed in the lower space for capturing images;

at least one light emitting module disposed on the heat conduction sheet and located in the upper space for emitting light out of the casing when the lens module captures the images, heat generated by the light emitting module being conducted to the upper heat-dissipating cover via the heat conduction sheet;

a printed circuit board having at least one electronic component;

a lower heat-dissipating cover covering the casing; and a heat conduction module disposed between the printed circuit board and the lower heat-dissipating cover, the heat conduction module comprising:

a mounting base having a heat conduction base portion and at least one heat conduction pillar portion, the at least one heat conduction pillar portion being connected to the lower heat-dissipating cover, the at least one electronic component being disposed on the heat conduction base portion, heat generated by the printed circuit board being conducted to the lower heat-dissipating cover via the heat conduction base portion and the at least one heat conduction pillar portion.

9. The image surveillance device of claim 8, wherein an edge of the partition has a first bending engaging structure, the casing has a second bending engaging structure corresponding to the edge of the partition, and the first bending engaging structure is engaged with the second bending engaging structure for making the partition engaged with the casing to form the upper space and the lower space respectively.

10. The image surveillance device of claim 8 further comprising:

a blocking pad disposed between the upper heat-dissipating cover and the casing.

11. The image surveillance device of claim 8, wherein the heat conduction module further comprises:

a heat dissipating sheet attached to an upper surface of the heat conduction base portion and the at least one electronic component, the heat generated by the printed circuit board being conducted to the lower heat-dissipating cover via the heat dissipating sheet, the heat conduction base portion and the at least one heat conduction pillar portion, a connection area between the at least one heat conduction pillar portion and the lower heat conduction cover is less than a heat dissipating area of the heat dissipating sheet.

12. The image surveillance device of claim 8 further comprising:

a heating sheet attached to a lower surface of the heat conduction base portion for heating the printed circuit board via the heat conduction base portion.

13. The image surveillance device of claim 8 further comprising:

a blocking pad disposed between the lower heat-dissipating cover and the casing.

14. The image surveillance device of claim 8, wherein the at least one light emitting module is an infrared light emitting diode.

* * * * *